United States Patent
Buyuksahin et al.

(10) Patent No.: US 11,875,619 B2
(45) Date of Patent: Jan. 16, 2024

(54) INFRASTRUCTURE CONTROLLER FOR AN INFRASTRUCTURE AND A KEY CONTROLLER FOR A KEY

(71) Applicant: NXP B.V., Eindhoven (NL)

(72) Inventors: Mehmet Ufuk Buyuksahin, Graz (AT); Wolfgang Eber, Graz (AT); Dorian Haslinger, Nestelbach bei Graz (AT)

(73) Assignee: NXP B.V., Eindhoven (NL)

( * ) Notice: Subject to any disclaimer, the term of this patent is extended or adjusted under 35 U.S.C. 154(b) by 25 days.

(21) Appl. No.: 17/504,767

(22) Filed: Oct. 19, 2021

(65) Prior Publication Data
US 2022/0198850 A1 Jun. 23, 2022

(30) Foreign Application Priority Data

Dec. 17, 2020 (EP) ..................................... 20215052

(51) Int. Cl.
*G07C 9/00* (2020.01)
*H04W 4/80* (2018.01)
*G07C 9/20* (2020.01)

(52) U.S. Cl.
CPC ........... *G07C 9/00309* (2013.01); *G07C 9/20* (2020.01); *H04W 4/80* (2018.02); *G07C 2009/00325* (2013.01); *G07C 2009/00769* (2013.01); *G07C 2209/61* (2013.01)

(58) Field of Classification Search
CPC .................. G07C 9/00309; G07C 9/20; G07C 2009/00325; G07C 2009/00769; H04W 4/80; H04W 4/029; H04L 2012/40215
See application file for complete search history.

(56) References Cited

U.S. PATENT DOCUMENTS

| | | |
|---|---|---|
| 9,885,773 B2 | 2/2018 | Hehn et al. |
| 9,967,722 B2 | 5/2018 | Knaappila |
| 10,440,533 B2 | 10/2019 | Gherardi et al. |
| 10,555,119 B2 | 2/2020 | Burugupalli et al. |
| 11,052,851 B1* | 7/2021 | Anvari .................... G16H 10/60 |
| 2016/0234684 A1* | 8/2016 | Hekstra .................... G06F 21/30 |
| 2018/0007523 A1 | 1/2018 | Knaappila |
| 2019/0058977 A1 | 2/2019 | Gherardi et al. |
| 2020/0015038 A1 | 1/2020 | Burugupalli et al. |
| 2020/0100283 A1* | 3/2020 | Naguib .................... B60R 25/24 |
| 2020/0182996 A1 | 6/2020 | Lee et al. |
| 2020/0384951 A1* | 12/2020 | Preradovic .............. H04W 4/40 |
| 2021/0402955 A1* | 12/2021 | Ahmed ................. B60R 25/245 |

FOREIGN PATENT DOCUMENTS

| | | |
|---|---|---|
| CN | 106028272 A | 10/2016 |
| JP | 2018517139 A | 6/2018 |
| KR | 102060172 B1 | 1/2020 |
| KR | 102104104 B1 | 4/2020 |

* cited by examiner

*Primary Examiner* — Vernal U Brown

(57) ABSTRACT

An infrastructure-controller for an infrastructure. The infrastructure-controller configured to: send a ranging-scheduling-signal to a key, wherein the ranging-scheduling-signal comprises timing-information for a subsequent ranging operation; and activate one or more ranging nodes associated with the infrastructure, for receiving a key-ranging-signal from the key, at an infrastructure-node-start-ranging-time based on the timing-information. The ranging-scheduling-signal has a frequency in a first RF frequency range. The key-ranging-signal has a frequency in a second RF frequency range.

18 Claims, 4 Drawing Sheets

INFRASTRUCTURE CONTROLLER FOR AN INFRASTRUCTURE AND A KEY CONTROLLER FOR A KEY

FIELD

The present disclosure relates to an infrastructure controller for an infrastructure such as a building or a vehicle to which a user desires access, and a key controller for a key, such as a key fob or a portable communications device, for gaining access to the infrastructure.

SUMMARY

According to a first aspect of the present disclosure there is provided an infrastructure-controller for an infrastructure, the infrastructure-controller configured to:
  send a ranging-scheduling-signal to a key, wherein the ranging-scheduling-signal comprises timing-information for a subsequent ranging operation; and
  activate one or more ranging nodes associated with the infrastructure, for receiving a key-ranging-signal from the key, at an infrastructure-node-start-ranging-time based on the timing-information;
  wherein:
    the ranging-scheduling-signal has a frequency in a first RF frequency range; and
    the key-ranging-signal has a frequency in a second RF frequency range.

Advantageously, such an infrastructure-controller can reduce power consumption at the infrastructure because the length of time that the ranging nodes are activated for receiving the key-ranging-signal can be reduced. Additionally, ranging operations with a plurality of keys can be scheduled such that the key-ranging-signals signals for the individual keys do not clash with each other.

In one or more embodiments the ranging-scheduling-signal is a BLE signal; and/or the key-ranging-signal is UWB signal.

In one or more embodiments, each of the ranging nodes comprises a ranging antenna.

In one or more embodiments the infrastructure-controller is further configured to, for each of one or more second keys:
  send a second-ranging-scheduling-signal to the second key, wherein the second-ranging-scheduling-signal comprises second-timing-information for a subsequent ranging operation; and
  activate the one or more ranging nodes associated with the infrastructure, for receiving a second-key-ranging-signal from the second key, at a second-infrastructure-node-start-ranging-time based on the second-timing-information.

The second-infrastructure-node-start-ranging-time may be set such that the ranging nodes are activated for the second key at a time that does not overlap with when the ranging nodes are activated for the first key and any other second keys if there are any. The second-ranging-scheduling-signal can have a frequency in the first RF frequency range. The second-key-ranging-signal can have a frequency in the second RF frequency range.

In one or more embodiments the infrastructure-controller is configured to set one or more of: an infrastructure-node-start-ranging-time; an infrastructure-node-stop-ranging-time; an infrastructure-node-ranging-duration; a second-infrastructure-node-start-ranging-time; a second-infrastructure-node-stop-ranging-time; and a second-infrastructure-node-ranging-duration such that the ranging nodes are activated for the one or more second keys at a time that does not overlap with when the ranging nodes are activated for the first key or any other second keys if there are any.

In one or more embodiments the infrastructure-controller is configured to:
  activate the one or more ranging nodes associated with the infrastructure by sending a node-activation-signal to the one or more ranging nodes over a Controller Area Network, "CAN", bus.

In one or more embodiments the infrastructure-node-start-ranging-time equals the timing-information.

In one or more embodiments the timing-information comprises an infrastructure-delay-period. The infrastructure-controller may be configured to determine the infrastructure-node-start-ranging-time by adding the infrastructure-delay-period to a clock-signal.

In one or more embodiments the infrastructure-controller is configured to:
  deactivate the one or more ranging nodes associated with the infrastructure at an infrastructure-node-stop-ranging-time based on the timing-information.

In one or more embodiments the infrastructure-controller is configured to determine the infrastructure-node-stop-ranging-time by adding a predetermined infrastructure-node-ranging-duration to the infrastructure-node-start-ranging-time. The timing-information may comprise the infrastructure-node-stop-ranging-time.

In one or more embodiments the infrastructure is a vehicle or a building.

In one or more embodiments the infrastructure-controller is configured to send an infrastructure-connection-signal to the key, to maintain a connection with the key. The infrastructure-connection-signal may have a frequency in the first RF frequency range.

In one or more embodiments the infrastructure-controller is further configured to:
  send an infrastructure-response-ranging signal to the key, in response to receiving the key-ranging-signal from the key;
  reactivate one or more of the ranging nodes associated with the infrastructure, for receiving a key-response-ranging-signal from the key, in response to sending the infrastructure-response-ranging signal.

In one or more embodiments the infrastructure-controller is further configured to:
  determine a ranging result based on the received key-ranging-signal.

In one or more embodiments the infrastructure-controller is configured to:
  activate a plurality of ranging nodes associated with the infrastructure, for receiving a plurality of instances of the key-ranging-signals from the key;
  activate the plurality of ranging nodes associated with the infrastructure, for receiving a plurality of instances of the key-response-ranging-signal from the key; and
  determine the ranging result based on: one or more of the plurality of instances received key-ranging-signal; and one or more of the plurality of instances of the received key-response-ranging-signal.

In one or more embodiments the infrastructure-controller is configured to:
  provide a control-signal to an actuator associated with the infrastructure based on the ranging result.

According to a further aspect of the present disclosure, there is provided a key-controller configured to:

receive a ranging-scheduling-signal from an infrastructure, wherein the ranging-scheduling-signal comprises timing-information for a subsequent ranging operation; and cause the key to send a key-ranging-signal to the infrastructure, at a key-ranging-time based on the timing-information;

wherein:
the ranging-scheduling-signal has a frequency in a first RF frequency range; and
the key-ranging-signal is in a second RF frequency range.

In one or more embodiments the key-controller is further configured to send a key-connection-signal to the infrastructure, to maintain a connection with the infrastructure. The key-connection-signal may have a frequency in the first RF frequency range.

In one or more embodiments the key-ranging-time equals the timing-information.

In one or more embodiments the timing-information comprises a key-delay-period. The key-controller may be configured to determine the key-ranging-time by adding the key-delay-period to a clock-signal.

In one or more embodiments the key-controller is associated with a key fob.

In one or more embodiments the functionality of the key-controller is provided by a mobile communications device (such as a smartphone).

According to a further aspect of the present disclosure there is provided a computer-implemented method for an infrastructure, the method comprising:

sending a ranging-scheduling-signal to a key, wherein the ranging-scheduling-signal comprises timing-information for a subsequent ranging operation; and activating one or more ranging nodes associated with the infrastructure, for receiving a key-ranging-signal from the key, at an infrastructure-node-start-ranging-time based on the timing-information;

wherein:
the ranging-scheduling-signal has a frequency in a first RF frequency range; and
the key-ranging-signal is in a second RF frequency range.

According to a further aspect of the present disclosure there is provided a computer-implemented method for a key, the method comprising:

receiving a ranging-scheduling-signal from an infrastructure, wherein the ranging-scheduling-signal comprises timing-information for a subsequent ranging operation; and causing the key to send a key-ranging-signal to the infrastructure, at a key-ranging-time based on the timing-information;

wherein:
the ranging-scheduling-signal has a frequency in a first RF frequency range; and
the key-ranging-signal is in a second RF frequency range.

There is also provided an infrastructure, including a vehicle, comprising any infrastructure-controller disclosed herein.

There is also provided a key, including a key fob or a mobile communications device, comprising any key-controller disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Ranging services can be used to determine the distance between an infrastructure (such as a building or a vehicle) and a key that is used to obtain access to the infrastructure. The functionality of the key can be provided by a key fob or by a portable communications device such as a smartphone. When the key is sufficiently close to the infrastructure, access can be granted by unlocking a door for example Such ranging services can result in a high burden of power consumption at the infrastructure in the way that a ranging operation can be initiated by the key. In some examples, before the ranging is started, communication over a radio frequency (such as Bluetooth Low Energy (BLE)) is used to connect the infrastructure to the key. Then the ranging can be performed over a different radio frequency (such as ultra-wideband (UWB)). The initial communication event (e.g. a BLE radio packet on the air) can be the only synchronization event that the infrastructure and the key can use to start the ranging service in a synchronized way.

Figure 1:
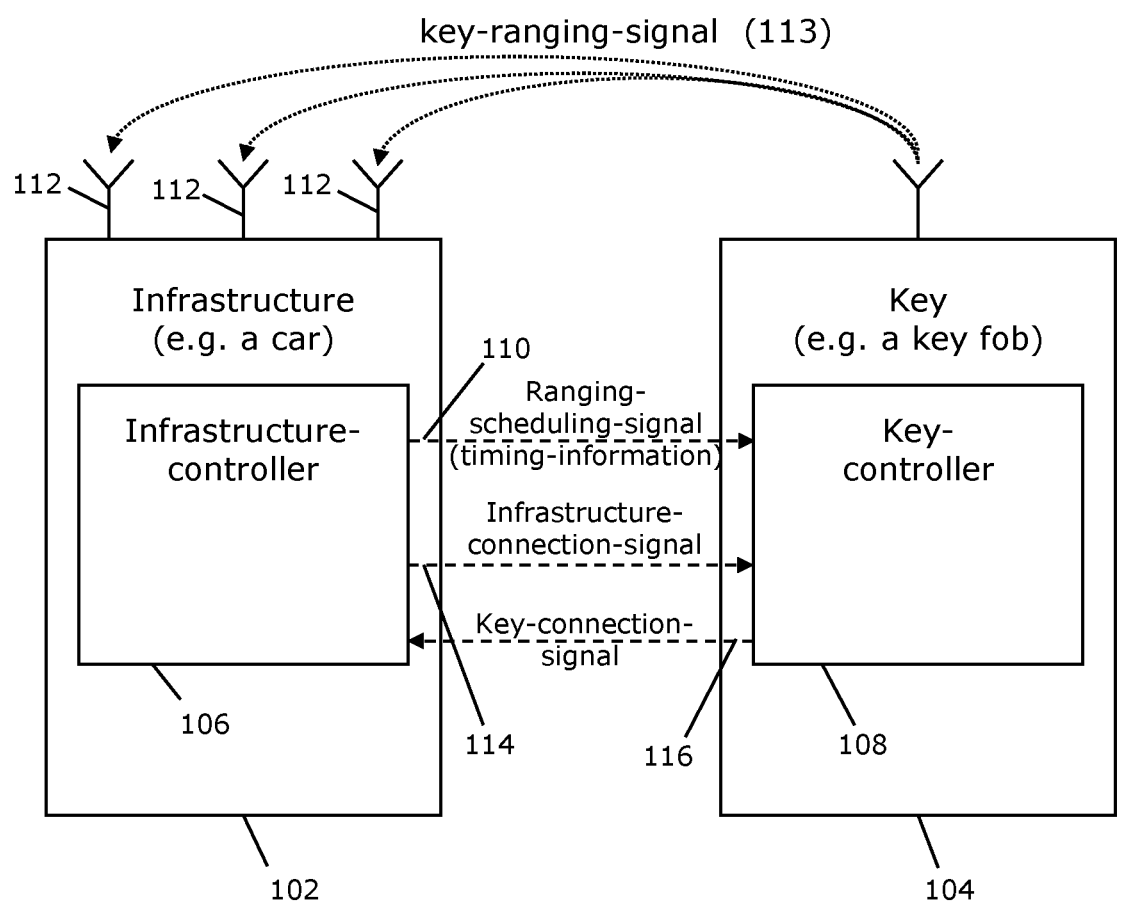
FIG. 1 shows an example embodiment of the present disclosure that includes an infrastructure and a key.

FIG. 1 shows an example embodiment of the present disclosure that includes an infrastructure 102 and a key 104. The infrastructure 102 includes an infrastructure-controller 106. The key 104 includes a key-controller 108. As indicated above, the infrastructure could be a car, a building, a room, public transport (such as handsfree public transport) or any other environment including those mentioned in all applications discussed in CCC (car connectivity consortium) and the FiRa consortium. The key 104 can be a key fob, such that the key-controller 108 is associated with the key fob. Alternatively, the functionality of the key-controller 108 is provided by a mobile communications device such as a smartphone.

The infrastructure 102 has one or more ranging nodes, and each ranging node can have a ranging antenna 112. In this example there are three ranging nodes/antennas 112. In the following description, each mention of a ranging antenna 112 can also be construed as applying to a corresponding ranging node. For example, any activation or deactivation of a ranging antenna can be considered as functionally equivalent to the activation or deactivation of a ranging node.

If there are a plurality of ranging nodes 112, then they can be located at different locations on, or associated with, the infrastructure 102. The ranging nodes/antennas 112 are for receiving ranging signals from the key 104, such that the infrastructure-controller 106 can determine the distance between the infrastructure 102 and the key 104.

The infrastructure-controller 106 is configured to send a ranging-scheduling-signal 110 to the key 104. The ranging-scheduling-signal 110 includes timing-information for a subsequent ranging operation. As will be discussed below, use of this timing-information to schedule the subsequent ranging operation can greatly reduce power consumption of the infrastructure 102.

The infrastructure-controller 106 can then activate the one or more ranging antennas 112, for receiving a key-ranging-signal 113 from the key 104, at an infrastructure-antenna-start-ranging-time (or equivalently an infrastructure-node-start-ranging-time) based on the timing-information. A ranging antenna 112 can be activated in any one of a number of ways. For instance, the ranging antenna 112, or a processor/module associated with it, can be activated by a microcontroller unit (MCU) sending an out-of-band control signal to the ranging antenna 112. Such an out-of-band control signal can be sent over a Controller Area Network (CAN) bus, for example.

The ranging-scheduling-signal 110 has a frequency in a first RF frequency range, and in this example is a BLE signal with a frequency of 2.4 GHz. This can represent a low power way of initiating the communication with the key 104. The key-ranging-signal 113 is in a second RF frequency range, which is different to the first RF frequency range. That is, the second RF frequency range can be considered as an out-of-band signal when compared with the first RF frequency range. In this example, the key-ranging-signal 113 is an ultra-wideband (UWB) signal with a frequency in the range of 3.1 to 10.6 GHz.

Having a ranging antenna 112 at the infrastructure 102 that is enabled to receive the key-ranging-signal 113 can consume a relatively high amount of power, which can be especially problematic when the infrastructure 102 is battery powered (such as when the infrastructure 102 is a vehicle). Such high power consumption can also cause problems with excess heat generation.

Turning now to the key-controller 108, it receives the ranging-scheduling-signal 110 from the infrastructure 102. As described above, the ranging-scheduling-signal 110 includes timing-information for a subsequent ranging operation. The key-controller 108 causes the key 104 to send a key-ranging-signal 113 to the infrastructure 102, at a key-ranging-time based on the timing-information. As will be described in detail below, the key-ranging-time (at which the key-controller 108 sends the key-ranging-signal 113) and the infrastructure-antenna-start-ranging-time (at which time the one or more ranging antennas 112 at the infrastructure 102 are activated) can be set based on the timing-information such that the ranging antennas 112 can reliably receive the key-ranging-signal 113 without being enabled for an unduly long time, thereby not consuming an unduly high amount of power.

In the example of FIG. 1, the infrastructure-controller 106 also sends an infrastructure-connection-signal 114 to the key 104 to maintain a connection with the key 104. Similarly, the key-controller 108 sends a key-connection-signal 116 to the infrastructure 102 to maintain a connection with the infrastructure 102. Such signals can be sent periodically, in accordance with a communications protocol that is being used. The infrastructure-connection-signal 114 and the key-connection-signal 116 have a frequency in the first RF frequency range, which in this example means that they are both BLE signals.

As will be discussed in detail below, the infrastructure-controller 106 can then determine a ranging result based on the received key-ranging-signal 113.

Figure 2:
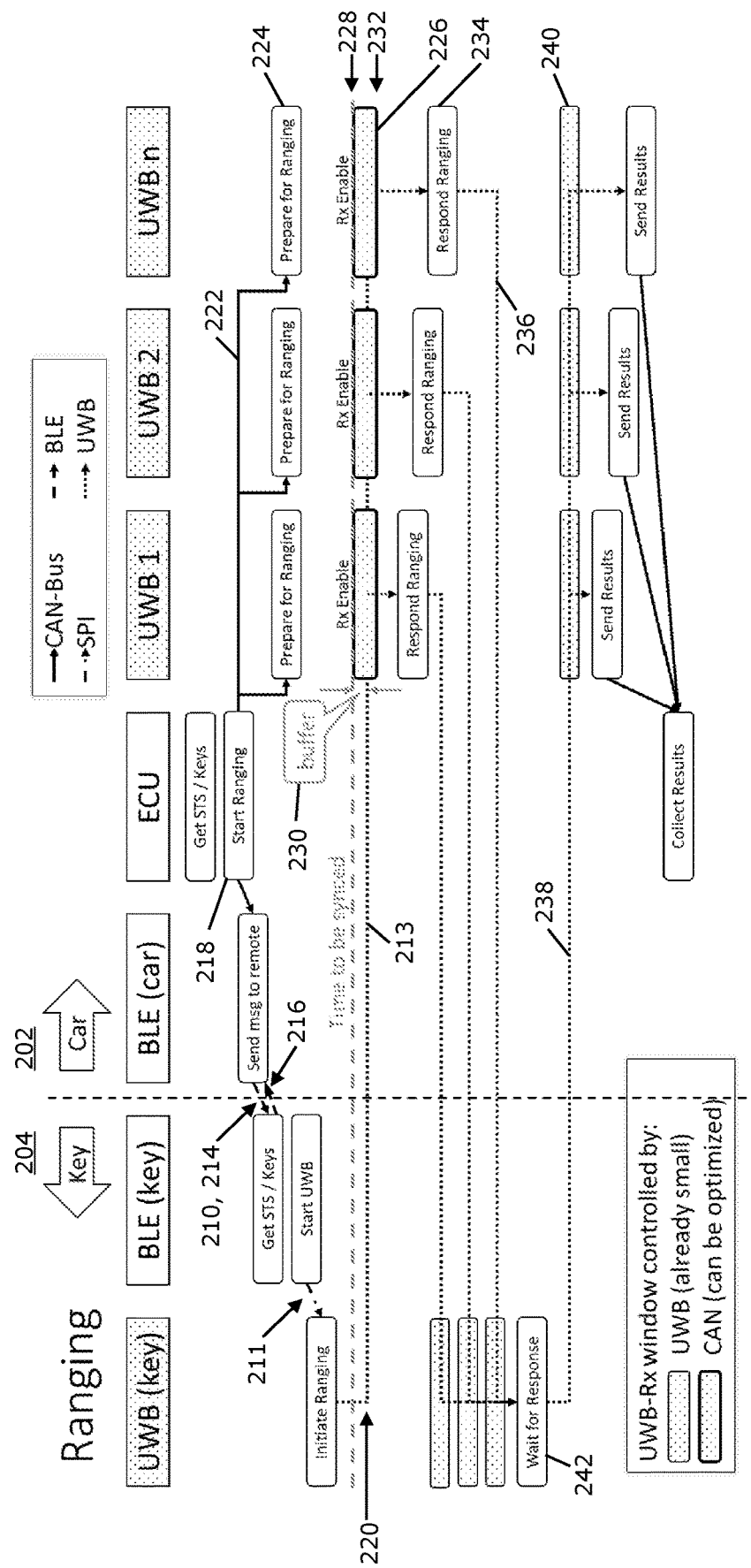
FIG. 2 shows schematically an example embodiment of a method for a key to communicate with an infrastructure (in this example a car) to perform a ranging operation, in which timing-information is exchanged in order to schedule the ranging operation.

Optionally, the infrastructure-controller 106 can then provide a control-signal to an actuator (not shown) based on the ranging result. For instance, to grant access to the infrastructure 102 by unlocking a door. In the example of FIG. 2, where there is a plurality of ranging antennas 112, the infrastructure-controller 106 can determine the ranging result based on a plurality of received key-ranging-signals 113.

The example of FIG. 1 can therefore provide scheduling of a ranging service/ranging operations, which are performed at the infrastructure 102. This can provide one or more of the following advantages:

Power optimization at the infrastructure side, which can be due to synchronization of the RX windows at the ranging antennas/anchors, and therefore a smaller RX window at the infrastructure side in particular;

Avoidance of collisions of ranging packets in the air, which could otherwise lead to retry via hopping; and Improved performance if there are multiple keys in a ranging infrastructure that are requesting a ranging service.

FIG. 2 shows schematically an example embodiment of a method for a key 204 to communicate with an infrastructure (in this example a car 202) to perform a ranging operation. Steps to the left of the vertical dashed line in FIG. 2 are associated with the key 204. Steps to the right of the vertical dashed line in FIG. 2 are associated with the car 202. As it is shown in FIG. 2, time increases in a vertically down direction.

The key 204 is shown as having two columns in which method steps can occur. The first column relates to ranging operations performed by the key 204, which involves sending and receiving UWB signals in this example. Such UWB signals are shown with dotted lines (as shown in the legend in the top-right corner of the drawing) and also with boxes that are filled with a dotted pattern (as shown in the legend in the bottom-left corner of the drawing). The second column relates to communication operations performed by the key 204, which involves sending and receiving BLE signals in this example. Such BLE signals are shown with dashed lines (as shown in the legend in the top-right corner of the drawing).

The car 202 is shown as having five columns in which method steps can occur. The first column relates to communication operations performed by the car 202, which involves sending and receiving BLE signals in this example. Such BLE signals are shown with dashed lines (again as shown in the legend in the top-right corner of the drawing). The second column relates to steps that are performed by an electronic control unit (ECU) of the car 202. The third to fifth columns relate to ranging operations that are performed by respective first to third ranging antennas associated with the car 202, and involve sending and receiving UWB signals in this example. Such UWB signals are again shown with dotted lines (as shown in the legend in the top-right corner of the drawing) and also with boxes that are filled with a dotted pattern (again as shown in the legend in the bottom-left corner of the drawing).

A ranging operation is started by the car 202 at step 218. In response, the ECU of the car 204 determines timing-information for the subsequent ranging operation. The timing-information may comprise an absolute time that the key 204 should send a key-ranging-signal 213 to the car 202—for instance at 16:10:56 using the 24-hour clock. Alternatively, the timing-information may include a key-delay-period (which may also be referred to as a delta-t) that should be waited before the key 204 sends the key-ranging-signal 213 to the car 202. Either way, the timing-information can be set such that the car 202 has sufficient time to enable its ranging antennas, and also such that the key 204 has sufficient time to receive an instruction from the car 202 and begin transmitting the key-ranging-signal 213 to the car 202.

The car 202 can then send a ranging-scheduling-signal 210 to the key 204, wherein the ranging-scheduling-signal 210 comprises the timing-information. In some examples, the ranging-scheduling-signal 210 can be provided as part of a periodic car-connection-signal 214 that the car 202 sends to the key 204 to maintain a BLE connection between the car 202 and the key 204.

The key 204 receives the ranging-scheduling-signal 210 from the car 202 and causes the key 204 to send the key-ranging-signal 213 to the car 202 at a key-ranging-time based on the timing-information. In this example, this is achieved by a BLE module in the key 204 sending a serial peripheral interface (SPI) message 211 to a UWB module in the key 204. This SPI message 211 is shown with a dot-dashed line in FIG. 2 (as shown in the legend in the top-right corner of the drawing). As discussed above, the key-ranging-time may equal the timing-information (i.e. the timing-information is an absolute time). Alternatively, the timing-information may comprise a key-delay-period, and the key 204 determines the key-ranging-time by adding the key-delay-period to a clock-signal.

The key-ranging-time is illustrated schematically in FIG. 2 with reference 220, as the instant in time that the key 204 sends the key-ranging-signal 213 to the car 202.

The key 204 can also send a key-connection-signal 216 to the car 202 to maintain the BLE connection with the car 202.

Returning to the processing that is performed at the car 202. In response to the ranging operation being started by the car 202 at step 218 and the determination of the timing-information, the car 202 activates the three ranging antennas that are shown in FIG. 2, at a car-antenna-start-ranging-time based on the timing-information. As discussed above, the ranging antennas are represented by the third to fifth columns of the car 202 in FIG. 2, and are for receiving instances of the key-ranging-signal 213 from the key 204.

In this example, the ECU of the car 202 sends an antenna-activation-signal 222 to each of the ranging antennas over a Controller Area Network (CAN) bus. The ECU can provide at least some of the functionality of the infrastructure-controller of FIG. 1. Signals sent over the CAN bus are shown as thick lines in FIG. 2 (as shown in the legend in the top-right corner of the drawing). The antenna-activation-signal 222 instructs each ranging antenna to prepare for ranging (step 224) and then activate the ranging antenna at the car-antenna-start-ranging-time, which is shown schematically in FIG. 2 with reference 228.

In a similar way to that described above with reference to the key-ranging-time 220 at the key 204, the car 202 can set the car-antenna-start-ranging-time 228 such that it equals the timing-information (i.e. the timing-information is an absolute time). The car-antenna-start-ranging-time 228 can be set such that it has an absolute time that matches the key-ranging-time 220, or the car-antenna-start-ranging-time 228 can be set such that it has an absolute time that is offset from (and later than) the key-ranging-time 220. In this way, a time buffer 230 can be provided between the key 204 sending the key-ranging-signal 213 and the ranging antennas being activated for receiving the key-ranging-signal 213.

Alternatively, the timing-information can include a car-delay-period, and the car 202 can determine the car-antenna-start-ranging-time by adding the car-delay-period to a clock-signal. The car-delay-period may the same as, or different to, the key-delay-period.

In some examples, the car 202 can deactivate the one or more ranging antennas at a car-antenna-stop-ranging-time 232 (or equivalently an infrastructure-node-stop-ranging-time) based on the timing-information. For instance, the car 202 can determine the car-antenna-stop-ranging-time 232 by adding a predetermined car-antenna-ranging-duration (or equivalently an infrastructure-node-ranging-duration) to the car-antenna-start-ranging-time 228. In other examples, the timing-information comprises the car-antenna-stop-ranging-time 232.

The length of time that the ranging antenna is activated is represented by the height of the box labelled as 226 in FIG. 2. This can also be referred to as a car-antenna-ranging-duration 226, and is the length of time between the car-antenna-start-ranging-time 228 and car-antenna-stop-ranging-time 232. At least the car-antenna-start-ranging-time 228 is set based on timing-information that is also used to set the key-ranging-time 220.

In response to receiving the key-ranging-signal 213 from the key 202, the car 202 responds 234 to the key-ranging-signal 213 by sending a car-response-ranging signal 236 to the key 204. The car-response-ranging signal 236 is a UWB signal in this example.

Also in response to receiving the key-ranging-signal 213 from the key 202, optionally the car 202 can deactivate the ranging antennas (i.e. the car does not need to wait for a predetermined antenna-stop-ranging-time 232 before deactivating the ranging antennas). Then, in response to sending the car-response-ranging signal 236, the car 202 can reactivate the ranging antennas for receiving a key-response-ranging-signal 238 from the key 204. This reactivation of the ranging antennas is shown schematically in FIG. 2 with boxes 240.

Turning back to the processing that is performed at the key 204, the key 204 waits for the car-response-ranging signal 236 from the car 202 (the waiting is shown schematically as box 242 in FIG. 2), and when it receives the one or more car-response-ranging signals 236 the key 204 responds with the key-response-ranging-signal 238. The key-response-ranging-signal 238 is also a UWB signal in this example. This exchange of UWB signals to complete the ranging operation is well-known in the art.

Turning again to the processing that is performed at the car 202, the car 202 can determine a ranging result based on: (i) one or more instances of the received key-ranging-signal 213; and (ii) one or more instances of the received key-response-ranging-signal 238. The ranging result may be a distance between the key 204 and the car 202, as is known in the art. The car can then provide a control-signal (not shown) to an actuator associated with the car based on the ranging result (e.g. to unlock the car).

Figure 3:
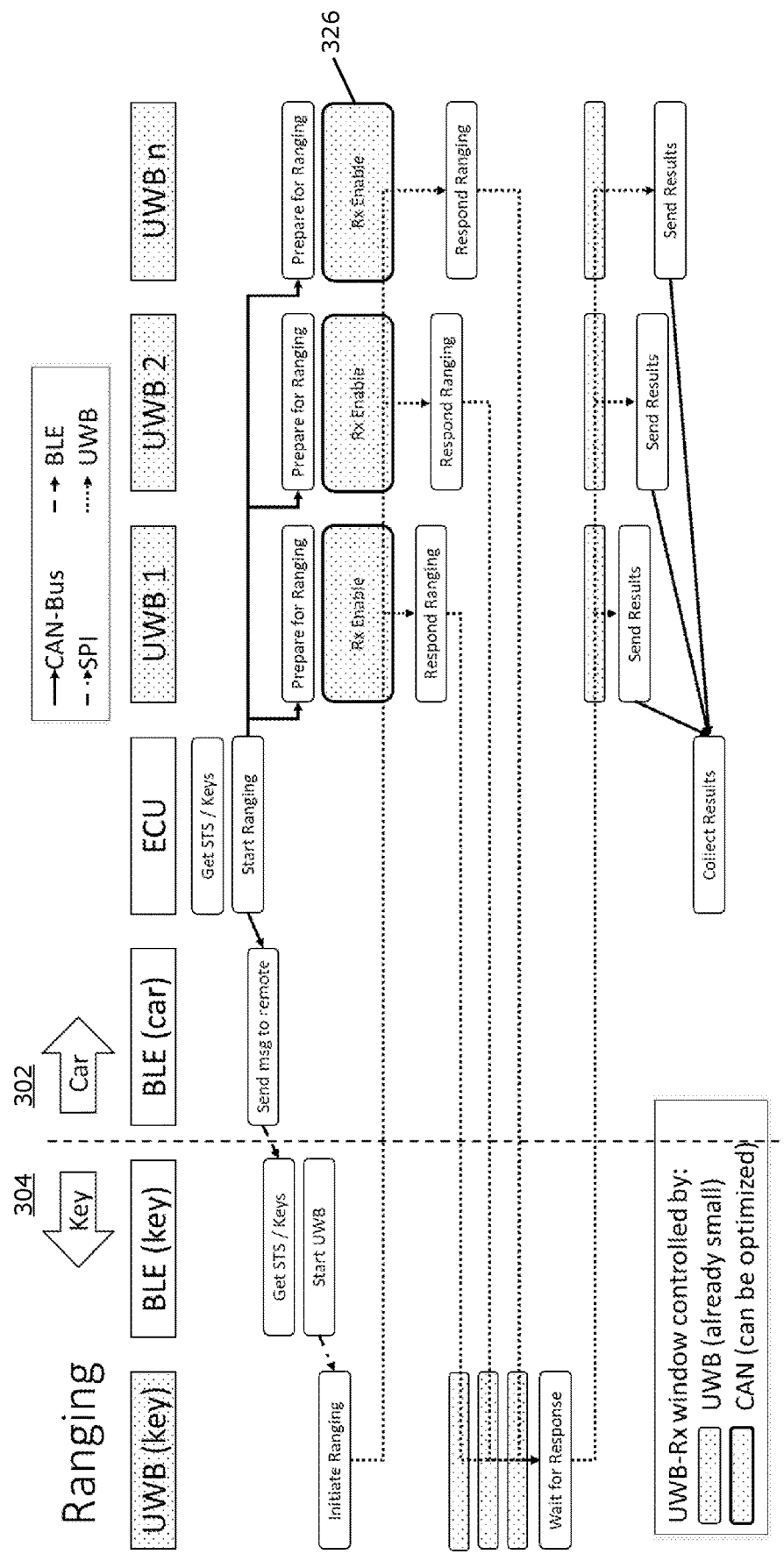
FIG. 3 shows schematically a method of a key communicating with a car to perform a ranging operation, in which timing-information is not exchanged in order to schedule the ranging operation.

FIG. 3 shows schematically a method of a key 304 communicating with a car 302 to perform a ranging operation, in which timing-information is not exchanged in order to schedule the ranging operation.

As shown in FIG. 3, the length of time 326 that the ranging antenna is activated is much longer than the equivalent duration in FIG. 2. This is because in FIG. 3 the ranging antennas are activated immediately in response to the initiation of the ranging operation. In practice this can result in the ranging antenna being activated for 25 seconds if the key 304 does not come within range of the car 302 to start exchanging UWB signals. For instance, if a user holding their key 204 is close enough to the car 202 for BLE communication to commence, but not close enough for UWB signals to be successfully exchanged, then the car can consume a significant amount of power in listening for UWB signals. In addition to the undesirable power consumption, this can also result in components associated with the ranging antennas overheating.

Figure 4:
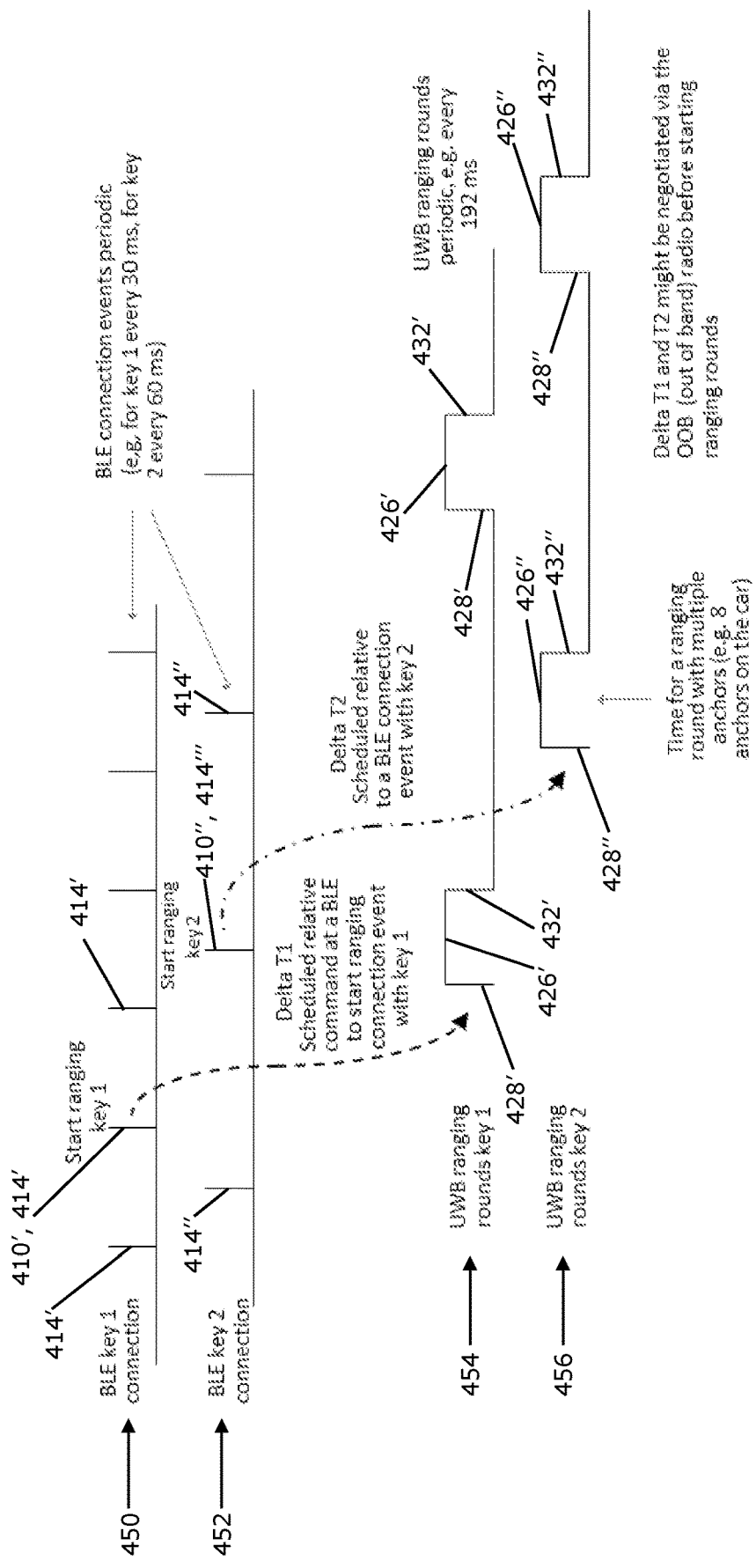
FIG. 4 shows an example of a timing diagram that illustrates BLE signals that can be sent from a car to schedule ranging operations with a first key and a second key.

FIG. 4 shows an example of a timing diagram that illustrates BLE signals that can be sent from a car to schedule ranging operations with a first key and a second key, wherein the ranging operations include exchanging UWB signals.

Advantageously, the ranging operations with the first key and the second key can be scheduled such that the UWB signals for the individual keys do not clash with each other. It will be appreciated that the functionality that will be described with reference to FIG. 4 can be extended to a system that includes more than one second key (and therefore more than two keys in total).

A BLE connection between the car and the first key (key 1) is shown with reference 450 in FIG. 4. This connection has periodic BLE connection events, which include at least a car-connection-signal 414'. In this example the BLE connection events occur every 30 ms.

A BLE connection between the car and the second key (key 2) is shown with reference 452 in FIG. 4. This connection also has periodic BLE connection events, which include at least a second-car-connection-signal 414" to maintain a connection with key 2. In this example the BLE connection events occur every 60 ms.

As shown in FIG. 4 a ranging operation with key 1 is initiated, which causes the BLE connection with key 1 to also include a ranging-scheduling-signal 410'. The ranging-scheduling-signal 410' includes timing-information that will be used by key 1 to set a key-ranging-time, at which time key 1 will send a key-ranging-signal to the car.

The car also uses the timing-information to set a car-antenna-start-ranging-time 428', at which time one or more ranging antennas associated with the car are activated for receiving the key-ranging-signal from key 1 and a ranging round is started. In this example, a car-delay-period (delta T1) is used to set the car-antenna-start-ranging-time 428'. In this way the ranging antenna is scheduled to be activated at the car-antenna-start-ranging-time 428' relative to the ranging-scheduling-signal 414'. The ranging rounds for key 1 are shown in FIG. 4 as having the car-antenna-start-ranging-time 428', a car-antenna-stop-ranging-time 432' and a car-antenna-ranging-duration 426'. In this example, the UWB ranging rounds for key 1 are periodic, occurring every 192 ms. The car-antenna-ranging-duration 426' is set such that there is sufficient time for a ranging round with multiple anchors/ranging antennas. For instance, there may be 8 anchors/ranging antennas on the car in one example.

FIG. 4 also shows that a ranging operation with key 2 is initiated, which causes the BLE connection with key 2 to also include a second-ranging-scheduling-signal 410". The second-ranging-scheduling-signal 410" includes second-timing-information that will be used by key 2 to set a second key-ranging-time, at which time key 2 will send a second-key-ranging-signal to the Car.

The car also uses the second-timing-information to set a second-car-antenna-start-ranging-time 428", at which time the one or more ranging antennas associated with the car are activated for receiving the second-key-ranging-signal from key 2 and a ranging round is started. In this example, a second-car-delay-period (delta T2) is used to set the second-car-antenna-start-ranging-time 428". In this way the ranging antenna is scheduled to be activated at the second car-antenna-start-ranging-time 428" relative to the second-ranging-scheduling-signal 414". The ranging rounds for key 2 are shown in FIG. 4 as having the second-car-antenna-start-ranging-time 428", a second-car-antenna-stop-ranging-time 432" and a car-antenna-ranging-duration 426". In this example, the UWB ranging rounds for key 2 are also periodic, occurring every 192 ms.

Advantageously, the car (for example a car-controller associated with the car) can set the second-car-antenna-start-ranging-time such that the ranging antennas are activated for the second key at a time that does not overlap with when the ranging antennas are activated for the first key. In this way, the likelihood of any clashes between the ranging operations can be reduced or avoided.

In some examples, a car-controller associated with the car can negotiate delta T1 and delta T2 using BLE signals (i.e. out-of-band signals when compared with the UWB ranging signals) before any UWB ranging signals are exchanged.

That is, a car-controller can set one or more of: a car-antenna-start-ranging-time, a car-antenna-stop-ranging-time, a car-antenna-ranging-duration, a second-car-antenna-start-ranging-time, a second-car-antenna-stop-ranging-time and a car-antenna-ranging-duration; such that the ranging antennas are activated for the second key at a time that does not overlap with when the ranging antennas are activated for the first key and any other second keys if there are any.

One or more of the examples disclosed herein propose as a first step (one portable device is doing the ranging service) that via a connectivity radio a payload is sent out in order to propose a time value, which can be a delay between the out of band connectivity radio packet and the time when a portable device will send out its first ranging radio packet. This delay can be matched to the internal capabilities of the infrastructure and the delays in this distributed network.

For instance, in a car there can be several BLE anchors connected via CAN to a central microcontroller. This microcontroller can control distributed UWB anchors via the same CAN bus or over different gateways. The car can have access to predetermined values for the internal delays that occur when switching on the UWB receivers, and on this basis it can send out a proposed time window for the portable device (all of that relative to a radio connection event on the air (e.g. a BLE connection between car and key)).

In the case of a further portable device appearing at the same time and being connected to the same infrastructure/car, this portable device may not be synchronized at all to the other portable device. However, the infrastructure/car can have access to the timings of the communications between the two portable devices. Examples disclosed herein can schedule the second portable device relative to the first running ranging service with the first portable device. E.g. because the car knows the connectivity to portable device 1 and 2. An example disclosed herein can propose another slot (by sending out another delay to the portable device 2). In this way, the different ranging sessions (session 1 and 2) are scheduled to avoid collisions. If a third device is found and connected, then this procedure can of course be extended such that the ranging sessions of all three devices do not collide.

As will be appreciated from the above discussion, examples disclosed herein can be especially useful in a car access system. This includes a car access system with many UWB receivers for localisation and BLE nodes for communication, and several authorized keys that can legitimately approach the car (this can be considered as a private fleet). Communication can start with low power BLE radio and after some time UWB ranging starts for localisation. The car first enables its own UWB receivers and then requests the key device to initiate ranging. The car should enable UWB receivers early enough in order not to miss incoming UWB messages. Here, the receive windows should be large enough since BLE communication delay and uncertainty may not be known—for instance they can variable based on the environment. However, advantageously this window can be reduced or minimized by executing both initiate and respond commands at known synchronized times. Thus, saving power on UWB nodes which are waiting for the incoming initiation message.

The car does not a priori need to know which of a plurality of keys is the preferred key and has to try (range) all devices that are detected. This method can avoid unnecessary collisions with a retry method (hopping sequence) that is currently proposed by the Car Connectivity Consortium (CCC) because it can actively schedule the ranging activities leading to a defined and optimized system performance.

This, examples disclosed herein can relate to active scheduling instead of hopping in time slots when collisions are detected. The scheduling can relate to scheduling ranging rounds to various keys/devices/tags.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An infrastructure-controller for an infrastructure, the infrastructure-controller configured to:
   send a ranging-scheduling-signal to a key, wherein the ranging-scheduling-signal comprises timing-information for a subsequent ranging operation; and
   activate one or more ranging nodes associated with the infrastructure, for receiving a key-ranging-signal from the key, at an infrastructure-node-start-ranging-time based on the timing-information;
   wherein:
      the ranging-scheduling-signal has a frequency in a first RF frequency range;
      the key-ranging-signal has a frequency in a second RF frequency range;
      the timing information of the range-scheduling signal indicates a time when the key is to send the key ranging signal to the infrastructure; and
      the one or more ranging nodes are subsequently deactivated based on the timing information.

2. The infrastructure-controller of claim 1, wherein:
   the ranging-scheduling-signal is a BLE signal; and
   the key-ranging-signal is UWB signal.

3. The infrastructure-controller of claim 1, wherein the infrastructure-controller is further configured to, for each of one or more second keys:
   send a second-ranging-scheduling-signal to the second key, wherein the second-ranging-scheduling-signal comprises second-timing-information for a subsequent ranging operation; and
   activate the one or more ranging nodes associated with the infrastructure, for receiving a second-key-ranging-signal from the second key, at a second-infrastructure-node-start-ranging-time based on the second-timing-information;
wherein:
the second-infrastructure-node-start-ranging-time is set such that the ranging nodes are activated for the second key at a time that does not overlap with when the ranging nodes are activated for the first key and any other second keys if there are any;
the second-ranging-scheduling-signal has a frequency in the first RF frequency range; and
the second-key-ranging-signal has a frequency in the second RF frequency range.

4. The infrastructure-controller of claim 3, wherein the infrastructure-controller is configured to set one or more of: an infrastructure-node-start-ranging-time; an infrastructure-node-stop-ranging-time; an infrastructure-node-ranging-duration; a second-infrastructure-node-start-ranging-time; a second-infrastructure-node-stop-ranging-time; and a second-infrastructure-node-ranging-duration such that the ranging nodes are activated for the one or more second keys at a time that does not overlap with when the ranging nodes are activated for the first key or any other second keys if there are any.

5. The infrastructure-controller of claim 1, wherein the infrastructure-controller is configured to:
activate the one or more ranging nodes associated with the infrastructure by sending a node-activation-signal to the one or more ranging nodes over a Controller Area Network, "CAN", bus.

6. The infrastructure-controller of claim 1, wherein the infrastructure-node-start-ranging-time equals the timing-information.

7. The infrastructure-controller of claim 1, wherein:
the timing-information comprises an infrastructure-delay-period; and
the infrastructure-controller is configured to determine the infrastructure-node-start-ranging-time by adding the infrastructure-delay-period to a clock-signal.

8. The infrastructure-controller of claim 1, wherein the infrastructure is a vehicle or a building.

9. The infrastructure-controller of claim 1, wherein:
the infrastructure-controller is configured to send an infrastructure-connection-signal to the key, to maintain a connection with the key; and
the infrastructure-connection-signal has a frequency in the first RF frequency range.

10. The infrastructure-controller of claim 1, wherein the infrastructure-controller is further configured to:
determine a ranging result based on the received key-ranging-signal.

11. The infrastructure-controller of claim 1, wherein the infrastructure-controller is configured to:
activate a plurality of ranging nodes associated with the infrastructure, for receiving a plurality of instances of the key-ranging-signals from the key;
activate the plurality of ranging nodes associated with the infrastructure, for receiving a plurality of instances of a key-response-ranging-signal from the key; and
determine the ranging result based on: one or more of the plurality of instances received key-ranging-signal; and one or more of the plurality of instances of the received key-response-ranging-signal.

12. The infrastructure-controller of claim 11, wherein the infrastructure-controller is configured to:
provide a control-signal to an actuator associated with the infrastructure based on the ranging result.

13. The infrastructure-controller of claim 1, wherein the time indicated by the timing information is one of an absolute time that the key is to send the key ranging signal to the infrastructure and a key delay period before the key is to send the key ranging signal to the infrastructure.

14. A key-controller configured to:
receive a ranging-scheduling-signal from an infrastructure, wherein the ranging-scheduling-signal comprises timing-information for a subsequent ranging operation; and
cause the key to send a key-ranging-signal to the infrastructure, at a key-ranging-time based on the timing-information, wherein one or more ranging nodes of the infrastructure are activated based on the timing information;
wherein:
the ranging-scheduling-signal has a frequency in a first RF frequency range;
the key-ranging-signal is in a second RF frequency range;
the timing information of the range-scheduling signal indicates a time when the key is to send the key ranging signal to the infrastructure; and
the one or more ranging nodes of the infrastructure are subsequently deactivated based on the timing information.

15. The key-controller of claim 14, wherein the time indicated by the timing information is one of an absolute time that the key is to send the key ranging signal to the infrastructure and a key delay period before the key is to send the key ranging signal to the infrastructure.

16. A computer-implemented method for an infrastructure, the method comprising:
sending a ranging-scheduling-signal to a key, wherein the ranging-scheduling-signal comprises timing-information for a subsequent ranging operation; and
activating one or more ranging nodes associated with the infrastructure, for receiving a key-ranging-signal from the key, at an infrastructure-node-start-ranging-time based on the timing-information;
wherein:
the ranging-scheduling-signal has a frequency in a first RF frequency range;
the key-ranging-signal is in a second RF frequency range;
the timing information of the range-scheduling signal indicates a time when the key is to send the key ranging signal to the infrastructure; and
the one or more ranging nodes are subsequently deactivated based on the timing information.

17. The computer-implemented method of claim 16 further comprising:
receiving, in a key, a ranging-scheduling-signal from an infrastructure, wherein the ranging-scheduling-signal comprises timing-information for a subsequent ranging operation; and
causing the key to send a key-ranging-signal to the infrastructure, at a key-ranging-time based on the timing-information;
wherein:
the ranging-scheduling-signal has a frequency in a first RF frequency range; and
the key-ranging-signal is in a second RF frequency range.

18. The computer-implemented method of claim 16, wherein the time indicated by the timing information is one of an absolute time that the key is to send the key ranging signal to the infrastructure and a key delay period before the key is to send the key ranging signal to the infrastructure.

* * * * *